Patented Oct. 2, 1951

2,570,050

UNITED STATES PATENT OFFICE 2,570,050

CONDENSATION PRODUCTS OF TERTIARY ALKYL MERCAPTANS AND ALKYLENE OXIDES

Lawrence T. Eby, Roselle, N. J., assignor to Standard Oil Development Company, a corporation of Delaware No Drawing. Application July 26, 1945, Serial No. 607,257

18 Claims. (Cl. 260—609)

This invention relates to a method of preparing sulfur bearing alcohols by the reaction of tertiary-alkyl mercaptans with an alkylene oxide and to the new class of sulfur bearing alcohols produced.

It is an object of this invention to provide the art with a commercially feasible method of making beta (tertiary-alkyl thio) ethanols.

It is a further object of this invention to prepare new and highly useful sulfur bearing alcohols.

It is another and further object of this invention to prepare new beta (tertiary-alkyl thio) ethanols that may be used to advantage in diesel fuels to improve the cetane number, as a plasticizer during the preparation of lube oil additives and as insecticides.

These and other objects will appear more clearly from the detailed description and claims which follow.

Heretofore only relatively low molecular weight mercaptans have been reacted with alkylene oxides to produce sulfur bearing alcohols. Tertiary mercaptans have not been reacted with alkylene oxides but only primary and secondary mercaptans have been used because tertiary mercaptans are less reactive and it was not thought that tertiary mercaptans, and especially those of high molecular weight, would react with alkylene oxides to a degree to make the reaction commercially feasible.

It has now been discovered that high molecular weight sulfur bearing alcohols can be made in good yields by the reaction of a high molecular weight tertiary mercaptan with an alkylene oxide in the presence of an alkaline catalyst.

The following equation probably represents the reaction taking place between a tertiary alkyl mercaptan and an alkylene oxide.

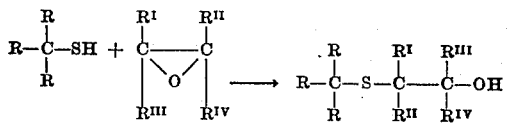

The R groups are all organic groups of alkyl, aryl, aralkyl or alkaryl nature which may or may not be the same; while $R^I$, $R^{II}$, $R^{III}$ and $R^{IV}$ are hydrogen or organic groups of alkyl, aryl, aralkyl or alkaryl nature.

Broadly stated, the invention is practiced by reacting a tertiary alkyl mercaptan with an alkylene oxide in the presence of alkaline catalyst such as a hydroxide of an alkali metal or a hydroxide of an alkaline earth metal or an alkyl substituted ammonium hydroxide such as a tetra- alkylammonium hydroxide, an example of which is tetramethylammonium hydroxide. The reaction temperature may be from 0° to 150° C., the preferred range is from 20° to 100° C. The catalyst may be an aqueous solution of the alkaline compound and the percent of the alkaline compound dissolved in water may be from 5–50%.

Some sulfur bearing alcohols produced by the reaction are: beta (tertiarybutyl thio) ethanol, beta (tertiarybutyl thio) isopropanol, tertiarybutyl thio-tertiarybutanol, beta (tertiaryamyl thio) ethanol, beta (tertiary-octyl thio) ethanol, beta (tertiary-octyl thio) isopropanol, beta (tertiary-octyl thio) secondary-butanol, tertiary-octyl thio-tertiarybutanol, beta (tertiary-decyl thio) ethanol and beta (tertiary-dodecyl thio) isopropanol. The scope of the invention is not intended to be limited by these examples.

The sulfur bearing alcohols prepared according to this invention can be used in a number of applications. They may be used as such in compositions or as their chemical derivatives. Chemical derivatives such as ethers, ester acids, and salts of ester acids may be prepared by reacting the alcohols with acids, acid halides and acid anhydrides of both organic and inorganic acids. Salts of ester acids may be prepared where the alcohol is reacted with di- or polybasic acids, the di- or polybasic acids may be saturated or unsaturated. Ethers may be prepared from the alcohols by customary methods. The alcohols and their ethers, esters, ester acids and salts of ester acids have a large number of uses, such as: plasticizers for rubber and plastics; oxidation inhibitors for rubber, oils and organic materials; wetting agents; textile aids; detergents; insecticides; fungicides; etc.

Examples of some of the derivatives of thio alcohols are: halides, acetates, trichloroacetates, benzoates, sulfates, sulfonates, xanthates, phosphates, thiophosphates, phosphites, thiophosphites, phosphonates, adipates, succinates, sebacates, fumarates, acrylates, methacrylates, etc.

The unsaturated esters may be polymerized to yield plastics and lube oil additives.

The sulfur bearing alcohols may be converted to halides by reacting them with hydrogen halides and the halides may be used in various reactions such as that with an alkali cyanide to form a nitrile. The nitriles and halides are valuable in themselves. The nitriles may be hydrolyzed to yield acids which may be converted into esters and amides. Thiocyanates and nitriles made from the sulfur bearing alcohols are valuable as insecticides.

Nitrates made from the sulfur bearing alcohols are valuable as ignition promoters in diesel fuels.

These sulfur bearing alcohols are effective insecticides. A modified Peet-Grady test was used to test the activity of these compounds in a refined mineral oil as a fly spray.

| Additive in Bayol D | Conc. | Per Cent Down in 2 Min. | Per Cent Down in 5 Min. | Per Cent Down in 10 Min. | Per Cent Dead in 24 Hrs. |
|---|---|---|---|---|---|
| | Per cent | | | | |
| None | | 20 | 29 | 35 | 7 |
| None | | 11 | 15 | 27 | 9 |
| beta (tert.-octylthio) ethanol | 8 | 53 | 79 | 81 | 53 |
| Do | 8 | 45 | 97 | | 27 |
| beta (tert.-octylthio) isopropanol | 8 | 55 | 71 | | 26 |
| Do | 8 | 31 | 37 | | 33 |

Sulfur bearing alcohols with ether linkages may also be prepared, preferably with acid type catalysts from the tertiary-alkyl thio ethanols and alkylene oxides.

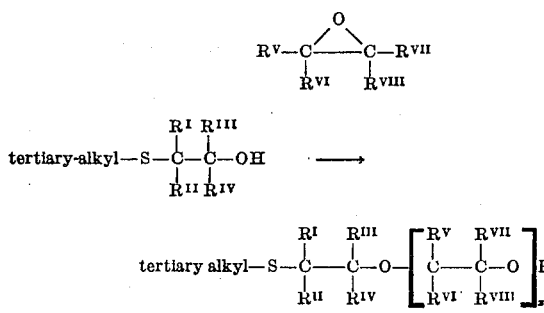

The groups $R^I$, $R^{II}$, $R^{III}$, $R^{IV}$, $R^V$, $R^{VI}$, $R^{VII}$ and $R^{VIII}$ are hydrogen, alkyl, aryl, alkaryl or aralkyl and $x$ is a whole number.

These alcohols have uses similar to those above and are to be considered part of this invention.

The invention is further illustrated by the following examples.

*Example I*

292 grams of diisobutylmercaptan was added with stirring to 80 g. of 10% NaOH in a 1 liter 3-neck round bottom flask whereupon a white precipitate formed. An excess of ethylene oxide was bubbled into the solution during a period of 32 minutes while the temperature was kept between 30 and 40° C. Stirring was continued for one hour after ethylene oxide addition was finished and there were two layers which separated when stirring was stopped. The organic layer was separated, washed with water, dried over anhydrous $K_2CO_3$ and distilled in an atmosphere of nitrogen. 331 grams (86.7% of the theoretical) of beta (tertiary-octyl thio) ethanol was distilled at 95–106° at a pressure less than 1 m. m. This fraction showed a refractive index of $N_D^{20}=1.4839$.

*Example II*

292 grams (2 mols) of diisobutyl mercaptan was added to 80 g. of 10% aqueous NaOH solution in a 1 liter 3-neck round bottom flask with stirring. 121.8 g. (2.1 mols) of propylene oxide were dropped into the flask over a period of 35 minutes while the temperature was kept between 25 and 30° C., the mixture was then stirred at room temperature (26° C.) for 12 hours. The organic layer was separated, dried over anhydrous $K_2CO_3$ and distilled. 345.1 g. of beta (tertiary-octyl thio) isopropanol, B. P. 83–95° at a pressure less than 1 m. m. were obtained which is 84.6% of the theoretical. This fraction showed a refractive index of $N_D^{20}=1.4801$ and the following analytical results were obtained:

| | Found | Calculated for beta (tertiary-octyl thio) isopropanol |
|---|---|---|
| | Per Cent | Per Cent |
| C | 64.89 | 64.69 |
| H | 11.87 | 11.77 |
| S | 15.33 | 15.68 |

*Example III*

Ethylene oxide was bubbled into a well stirred solution of 50.5 grams of tertiarydodecylmercaptan, prepared from commercial triisobutylene, and 10 c. c. of 10% aqueous sodium hydroxide in a 500 c. c. flask over a period of two hours. The initial temperature was 36.5° C. and it rose to 82° C. The flask was not cooled by external means during this time. The total weight gained was 14.9 grams. After standing over night the solution was extracted with ether; the ether extract was washed first with dilute HCl and then with dilute aqueous sodium-bicarbonate and finally, dried over anhydrous potassium carbonate. The ether solution was filtered and fractionally distilled. Beta-(tertiary-dodecyl thio) ethanol was obtained.

*Example IV*

20.8 grams of propylene oxide was dropped during a period of five minutes into a vigorously stirred solution of 50.5 grams of tertiarydodecylmercaptan, prepared from commercial triisobutylene, and 10 c. c. of 10% aqueous sodium hydroxide in a 500 c. c. flask. The temperature was kept below 35° C. for two hours after the addition was finished. The stirring was continued for 18 hours. The solution was extracted with ether, which extract after being washed first with dilute HCl and then with dilute aqueous sodium bicarbonate, was dried over anhydrous potassium carbonate. The ether solution was filtered and fractionally distilled. Beta-(tertiary-dodecyl thio) isopropanol was obtained.

The invention may be practiced in a continuous manner by slowly and uninterruptedly adding the alkylene oxide and the mercaptan with alkaline agent to the reaction flask while at the same time continuously drawing off the oily layer of sulfur bearing alcohol as it is formed and rises to the top of the reaction mixture.

Having thus described the invention, what is claimed as new and desired to secure by Letters Patent is:

1. Beta (tertiary-alkyl thio) ethanols having the general formula

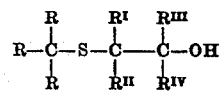

wherein each R is selected from class consisting of alkyl, aryl, aralkyl and alkaryl groups and wherein $R^I$, $R^{II}$, $R^{III}$ and $R^{IV}$ are each selected from the class consisting of hydrogen and alkyl group.

2. 1,1,3,3-tetramethylbutyl beta-hydroxyethyl sulfide.

3. 1,1,3,3-tetramethylbutyl beta-hydroxypropyl sulfide.

4. Beta-(tertiary dodecyl thio) ethanol.

5. The condensation product of tert.-dodecyl mercaptan derived from a polymerized olefin with ethylene oxide.

6. The condensation product of a tertiary alkyl mercaptan with ethylene oxide.

7. The condensation product of a tertiary octyl mercaptan with ethylene oxide.

8. The condensation product of a tertiary dodecyl mercaptan with ethylene oxide.

9. The process which comprises reacting a tertiary alkyl mercaptan with ethylene oxide in the presence of an alkaline catalyst.

10. The condensation product of a tertiary alkyl mercaptan derived from a polymerized olefin with ethylene oxide.

11. The condensation product of a tertiary octyl mercaptan derived from a polymerized olefin with ethylene oxide.

12. The process which comprises reacting a tertiary alkyl mercaptan derived from a polymerized olefin with ethylene oxide in the presence of an alkaline catalyst.

13. The condensation product of tertiary alkyl mercaptan with propylene oxide.

14. The condensation product of tertiary alkyl mercaptan derived from a polymerized olefin with propylene oxide.

15. Beta (tertiary-dodecyl thio) isopropanol.

16. A process which comprises reacting tertiary alkyl mercaptan with an alkaline oxide containing from 2 to 4 carbon atoms per molecule in the presence of an alkaline catalyst.

17. A process which comprises reacting tertiary alkyl mercaptan with propylene oxide in the presence of an alkaline catalyst.

18. The condensation product of a tertiary alkyl mercaptan with an olefin oxide containing 2 to 4 carbon atoms per molecule.

LAWRENCE T. EBY.

REFERENCES CITED

The following references are of record in the file of this patent:

UNITED STATES PATENTS

| Number | Name | Date |
|---|---|---|
| 2,129,709 | Schuette | Sept. 13, 1938 |
| 2,392,103 | Schlosser | Jan. 1, 1946 |

FOREIGN PATENTS

| Number | Country | Date |
|---|---|---|
| 665,371 | Germany | Sept. 24, 1938 |

OTHER REFERENCES

Nenitzescu et al., Berichte, vol. 68B, pages 587–91.

Beilstein, "Handbuch der Organischen Chemie," 4th ed., vol. 1, supp. 2, page 544.